United States Patent [19]

Zagwyn

[11] 4,064,547

[45] Dec. 20, 1977

[54] VEHICLE ANTITHEFT DEVICE

[76] Inventor: Conrad J. Zagwyn, 60 Greentree Lane, South Weymouth, Mass. 02190

[21] Appl. No.: 693,204

[22] Filed: June 4, 1976

[51] Int. Cl.² .......................................... H01H 47/22
[52] U.S. Cl. .............................. 361/172; 307/10 AT; 361/189
[58] Field of Search ................. 317/134, 135, 148.5 B; 361/171, 172, 189; 307/10 AT; 70/278; 340/64

[56] References Cited

U.S. PATENT DOCUMENTS

| | | | |
|---|---|---|---|
| 1,852,711 | 4/1932 | Cutler | 361/171 X |
| 3,634,697 | 1/1972 | MacFarlane | 307/10 AT |
| 3,675,035 | 7/1972 | Brasty | 307/10 AT |

Primary Examiner—Harry E. Moose, Jr.

Attorney, Agent, or Firm—Wolf, Greenfield & Sacks

[57] ABSTRACT

A vehicle anti-theft device includes a number of code input switches incorporated into the electrical system for the vehicle engine. The switches are controlled at the driver's station, for example, by being mounted on an automobile dashboard. Each of the switches is a multi-position switch having an alpha-numeric indicia indicator, to indicate the particular position of the switch. Starting the engine requires that the switches first be set to a predetermined code configuration in order to complete the electrical circuits necessary for starting the engine. Means also are provided to self-disable the electrical circuit when the engine is shut off to require that the switches be reset in a predetermined manner in order to restart the engine.

4 Claims, 5 Drawing Figures

VEHICLE ANTITHEFT DEVICE

BACKGROUND AND SUMMARY OF THE INVENTION

This invention relates to anti-theft devices for vehicles such as automobiles, motorcycles or the like. More particularly, the present invention relates to the incorporation of a series of operator-controlled switches into the electrical system associated with the engine in which the switches must be set to a predetermined, code-like configuration before the engine can be started.

In each embodiment of the invention, the line from the battery to the starter motor has a relay-operated switch which is normally open to prevent operation of the starter motor. The relay is connected to the battery through a self-locking gating device, such as an SCR, the operation of which is controlled by setting one of the code input switches to a predetermined preliminary position. That code input switch then must be switched to a second predetermined position to connect the battery with the ignition coil. Preferably, a second multi-position code input switch is connected between the other side of the ignition coil and the points in a manner which also requires setting of that second input switch to a predetermined position.

In a modified form of the invention, the second code input switch usually must be set to an inoperative position while the first code input switch is being sequenced as described above.

In a further embodiment of the invention, a third code input switch is added and is connected with respect to the points to short the points in all but one of the switch positions. In another embodiment of the invention, a fourth code input switch may be provided between the gating device and the relay. This adds a fourth required code input and also requires a specific sequence of operation of the first and fourth code input switches in that the fourth code input switch must be set to a predetermined position before the first code input switch is operated.

In each embodiment of the invention, the relay deactuates automatically when the main ignition switch is shut off and the switching system becomes automatically disabled, thus requiring that the code input switches be reset in order to restart the engine. This insures that the engine cannot be restarted in the event that the operator forgets to scramble the code input switches when leaving the automobile.

It is among the general objects of the invention to provide an improved vehicle anti-theft device.

A further object of the invention is to provide a vehicle anti-theft system which precludes operation of the electrical system of the vehicle engine until a number of code input switches are set to predetermined positions and in a predetermined sequence.

Another object of the invention is to provide a system of the type described which is self-disabling when the engine ignition system is shut off.

DESCRIPTION OF THE DRAWINGS

The foregoing and other objects and advantages of the invention will be appreciated more fully from the following further description thereof, with reference to the accompanying drawings wherein.

DESCRIPTION OF PRIMARY CIRCUIT

Figure 1:
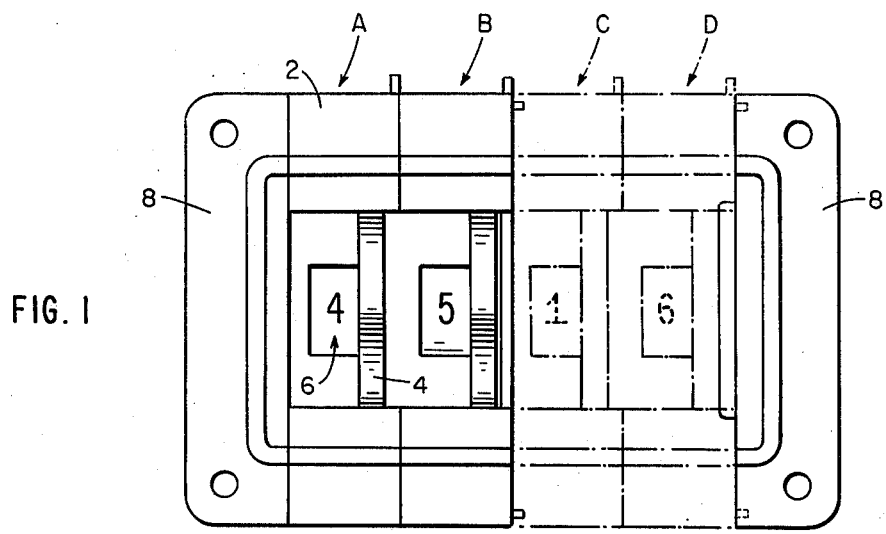
FIG. 1 is an illustration of an array of multi-position code input switches as might be mounted on an automobile dashboard.

FIG. 1 shows a front elevation of an array of multiposition code input switches as they might be mounted on an automobile dashboard and as they would appear to the operator of the vehicle. In the embodiment shown, the array of switches is built up from individual switch modules A, B and if desired, two additional modules shown in phantom at C and D. Each of the switch modules includes a housing 2, a control member such as an exposed ring 4 and a numerical switch position indicator to expose the particular position to which the switch is set. In the embodiment shown, each of the switch modules is a ten position switch having position indicia from 0 through 9. Individual modular switches of this type are available commercially, for example, from Digitran, 855 South Arroyo Parkway, Pasadena, Ca. 91105. Two or more modules may be stacked, in line, against each other to form an array of the desired number of switches, depending on the complexity of the code input requirements as desired. FIG. 1 shows in solid a two-switch array and also illustrates in phantom the addition of two more switches which might be employed to make a four-switch array. The ends of the array may be capped with end caps 8 which are available with such modular switch systems.

Figure 2:
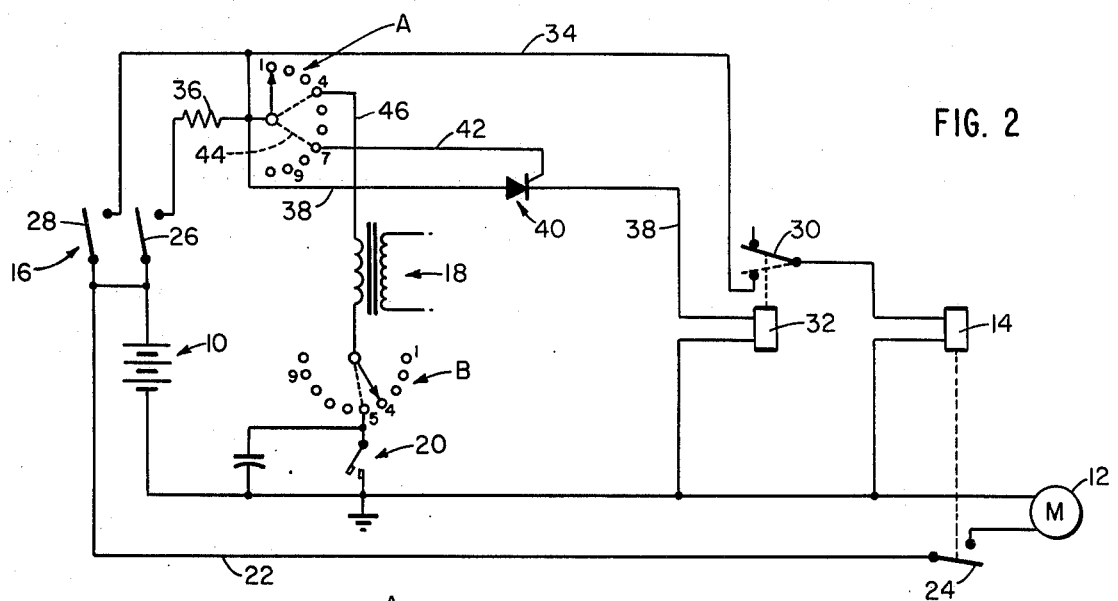
FIG. 2 is a schematic illustration of one embodiment of the invention.

FIG. 2 shows one embodiment of the invention employing a two code input switch system (as shown in solid) wired into a conventional automotive engine circuit. The arrangement includes the battery 10, starter motor 12 and starter motor solenoid 14, ignition switch 16, coil 18 and distributor points 20 or their equivalent, such as more recently developed "electronic" ignitions. Power is supplied from the battery 10 to the starter motor 12 through line 22 and contact 24 of the starter solenoid 14. Contact 24 normally is open and closes in response to actuation of solenoid 14. As will be described, actuation of solenoid 14 requires the digital input switches to be set to the predetermined code.

Ignition switch 16 has a pair of sequentially operable contacts including an ignition contact 26 and a starting circuit contact 28. Typically, the ignition contact is closed by turning the ignition key to a first position which connects the coil 18 and points 20 in circuit with the battery so that when the starting circuit contact 28 is subsequently closed (by advancing the ignition switch to its second position), the starter motor solenoid 14 will be energized through line 34 to operate the starter motor, to crank the engine.

In accordance with the embodiment of the invention shown in FIG. 2, a switch 30, operated by a relay 32 is interposed in the line 34 between the starter switch 28 and starter solenoid 14. Relay 32 normally is de-energized and switch 30 is in its open position shown in solid in FIG. 2. In order to operate the starter motor 12, relay 32 must first be actuated to close the switch 30 (to the position shown in phantom in FIG. 2) thus connecting the battery 10 through line 34 and switch 30 to the starter solenoid 14. The energizing current for relay 32 is directed from the battery 10 through ignition switch 26, ballast resistor 36 and line 38. A gating device 40, illustrated in this embodiment as an SCR, is interposed in line 38. The SCR 40 normally is switched to its off, non-conducting state, thus normally disabling the relay 32. The SCR 40 may be actuated to its conductive state through line 42 which is connected through one of the code input switches A, through resistor 36 and switch 26, to the battery 10. With the ignition switch 26 closed and input switch A set to the position shown in phantom at 44 (illustrated here as the number 7 position), the SCR 40 is switched on to permit current to flow through line 38 and energize the relay 32. When relay 32 is energized, contact 30 switches to its position shown in phantom to connect the starter motor solenoid 14 in circuit with the battery to enable operation of the starter motor 12 when the starter motor switch 28 is closed.

The ignition coil 18 and points 20 also are controlled by switch A and a second, similar switch B. The input side of the coil 18 is connected to another of the contacts of switch A (for example, the contact identified as no. 4) by the line 46. Switch B is interposed between the coil 18 and the points 20. In order to start the engine, switch 26 must be closed, switch A must be set initially to connect with line 42 (set to the number 7 in the embodiment illustrated) to switch SCR 40 on, energize relay 32 and connect starter solenoid 14 with starter switch 28. Switch A then must be reset to a different contact position (number 4 in the embodiment illustrated) to connect the coil 18. The SCR 40 having been pulsed previously through line 42 remains in its conductive state. Switch B then is set to its operative position (number 5 in the embodiment shown) to complete the circuit through the coil 18 and points 20. Starter motor switch 28 then may be closed to start the engine. Thus, in this illustrative embodiment utilizing two code input switches (having an arbitrarily selected code), switch A must first be set to 7 and then returned to its primary number 4 position. Switch B may be set to its operative number 5 position either before or after switch A has been set.

Gating switch 40, illustrated here as an SCR, is selected to remain in its conductive state only as long as current continues to flow through line 38. This provides a self-disabling function which, when the ignition switch 26 is shut off, will automatically switch the SCR 40 to its non-conductive "off" state. In order to restart the engine, it is necessary to reset at least switch A as described above. This provides somewhat of a fail-safe function in the event that the operator of the automobile neglects to scramble the switches A and B before leaving the vehicle.

Figure 3:
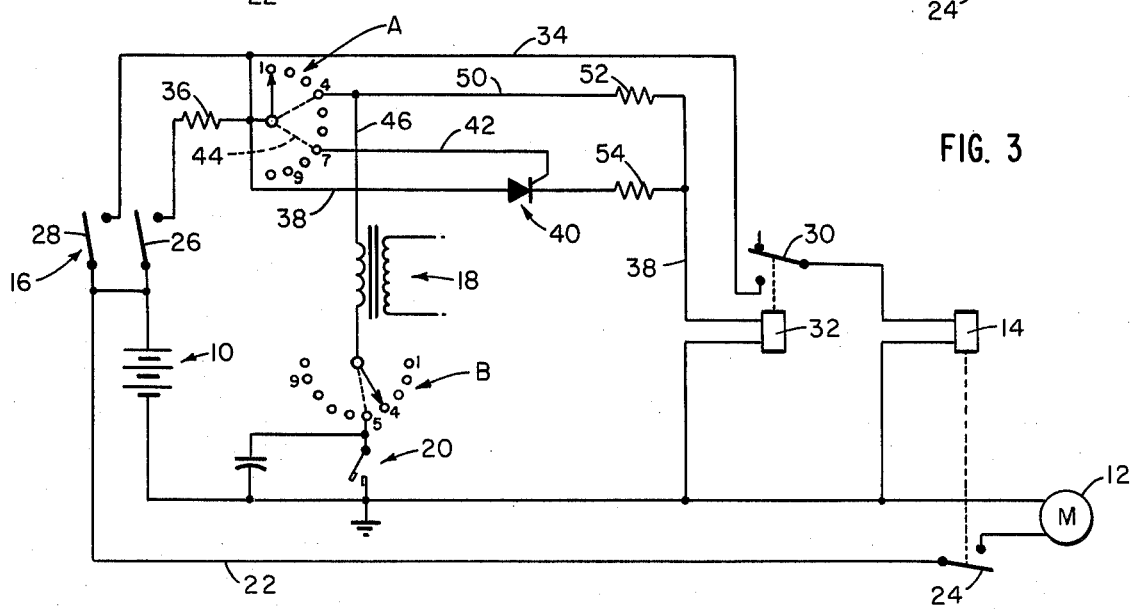
FIG. 3 is a schematic illustration of a modified form of the invention.

In the embodiment of the invention shown in FIG. 2, it is not strictly essential to open switch B while setting or resetting switch A. Thus, in the embodiment shown in FIG. 2, switches A and B need not be operated in any sequence. It may be desirable in some instances to modify the circuit to randomly require such a sequence of operation and, to this end, FIG. 3 shows such a modification. The circuit shown in FIG. 3 is substantially the same as that in FIG. 2 except that a line 50 is connected between the positive side of the coil 18 and the relay 32. A resistor 52 is interposed in line 50. A resistor 54 also is interposed between the SCR 40 and the relay 32. Resistors 52 and 54 each are selected to present an impedance such that the current through either line 50 or from the SCR 40 will be insufficient, individually, to switch the relay 32, their additive effects being required to actuate relay 32. This modification of the circuit requires, in most instances, that switch B be set to an open position (e.g., no. 4) to insure that the full current will flow through line 50 and will not be partly drawn off through line 46 and the points 20 in the randomly determined event that the points were closed when the engine stopped. When this embodiment of the invention is used, switch B is first set to an open contact. With ignition switch 26 closed, switch A then is set to its preliminary no. 7 position to switch the SCR 40 to its conductive state. Switch A then is reset to its second (no. 4) position to connect the line 50 between the battery and the solenoid 32. The additive currents from resistors 52 and 54 are sufficient to energize relay 32 to close switch 30 and actuate starter motor solenoid 14 to close switch 24 and set the starter motor circuit to be operated when switch 28 is closed. After switch A has been thus operated, switch B then is switched to its conductive position (no. 5) to connect the coil 18 with the points 20. If the points were closed when the engine was stopped or, after the starter motor is operated and the points then are closed, the no. 5 position of switch B will cause some of the current from line 50 to be shunted through line 46 and through the coil and points. Although this will reduce the additive currents from resistors 52 and 54, below the level required to initiate latching of the relay 32, relay 32 will not deactuate in response to reduced current through line 50. This is due to the fact that the latching current required to initially actuate relay 32 is far greater than the current required to hold it in its latched position. The amount of current shunted through line 46 is insufficient to reduce the additive effects of the currents through resistors 52 and 54 to a level low enough to deactuate the relay 32. Starting of the engine then is accomplished in the same manner described with respect to the embodiment in FIG. 2 by simply then closing switch 28.

Figure 4:
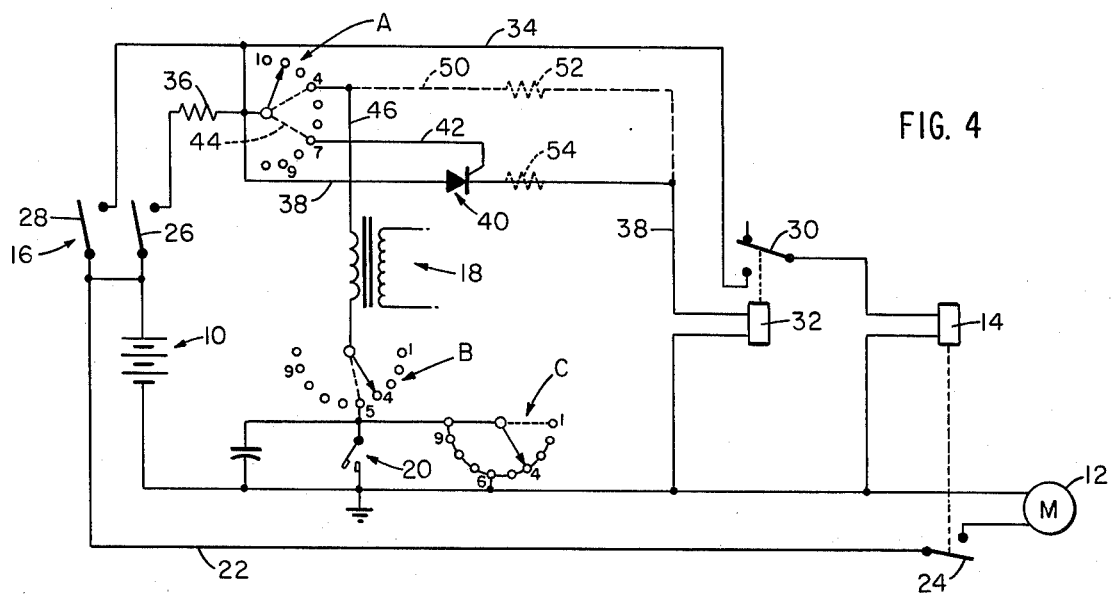
FIG. 4 is a schematic illustration of a further modified form of the invention employing three code input switches.

FIG. 4 shows a further modification to the invention in which a third code input is added by adding a third code input switch, indicated at C. Switch C has all but one of its contacts connected to each other and shorted across the points 20. Starting the engine requires also that switch C be set to the unshorted contact which is indicated in FIG. 4 as no. 1. Thus, in order to start the engine with this embodiment, it is necessary to set all three switches A, B and C to the predetermined code, and with switch A being sequentially set to two different positions, first to actuate SCR 40 and then to connect the battery 10 with the coil 18.

The code input switch C may be used in conjunction with the modification shown in FIG. 3 as suggested in phantom in FIG. 4, to require a predetermined sequence of operation between code input switches A, B and C. FIG. 4 shows in phantom the line 50 and resistors 52 and 54 which are selected to have an impedance which will require the additive effects of current from resistors 52, 54 in order to actuate relay 32 as described above. In order to insure that sufficient current will flow to relay 32, it is essential that the circuit from the coil 18 to ground be open while code input switch A is sequenced to its preliminary, and then prime, positions. Thus, in order to insure that there will be no current shunted through the coil, switch C must be set to its open contact (no. 1) and switch B preferably be set to an open contact before switch A is operated. Thus, in the embodiment illustrated, switches B and C first must be set to, for example, their 4 and 1 positions, respectively, switch A may then be set to its 7 position and then to its 4 position and then switch B must be set to its 5 position. It also may be noted that when switch C is employed with the resistors 52, 54, switch B may be omitted if it is desired to have a somewhat less complex system. In that arrangement, it would first be necessary to set switch C to its open contact (no. 1) before sequencing switch A.

Figure 5:
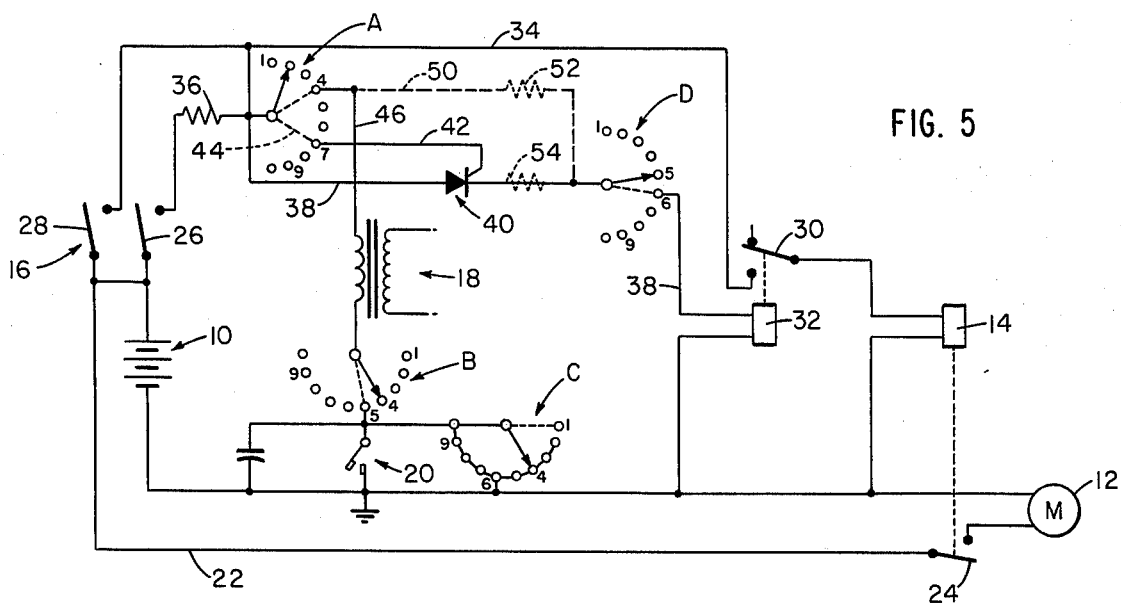
FIG. 5 is a schematic illustration of a further modified form of the invention employing four code input switches.

FIG. 5 shows a further embodiment of the invention in which a fourth code input switch D is added between the SCR 40 and the relay 32. Only one of the switch contacts, for example, the contact numbered 6 is connected to the relay 32, thus requiring a four digit code and in which one of the code switches (switch A) must be set to two predetermined digits. Also, by interposing a code switch D between the gate 40 and the relay 32, it becomes necessary to operate switch D and A in a sequence, in which D is first set to its operative (no. 6) position before switch A is sequenced. In addition, the system also provides means by which different of the code input switches must be operated in a predetermined sequence, if desired.

From the foregoing, it will be appreciated that systems of varying complexity may be utilized. In each, it is preferred that at least one of the code input switches must be set to two sequential positions in order to enable the engine to be started and also in order to enable the system to be self-disabling when the engine is shut off, thereby requiring resetting of at least some of the switches in a predetermined order in order to restart the engine.

The introduction of impedance 52 and 54 in phantom line 50 FIG. 5 limits the current, as described in FIG. 4, such that coil 18 must be opened by switch B to enable sufficient current to plow to relay 32 to close and latch contents 30.

It should be understood that the foregoing description of the invention is intended merely to be illustrative thereof and that other modifications and embodiments may be apparent to those skilled in the art without departing from its spirit.

Having thus described the invention, what I desire to claim and secure by Letters Patent is:

1. A vehicle anti-theft device for enabling and disabling the starting and ignition circuits associated with a vehicle engine comprising:
   a relay-operated switch interposed in the starting circuit;
   a multi-position code input switch having an indicia display for each position of the switch, said switch having an input terminal connected to the battery and a plurality of output terminals;
   a primary of the output terminals being connected to the ignition circuit;
   said relay being connected to the battery through a self-locking gate constructed and arranged to be switched to a conductive configuration and to remain in said conductive configuration as long as current flows therethrough;
   said gate having an actuating input terminal connected to a different, secondary of the output terminals of said code input switch thereby requiring the code input switch to first be set to its secondary position to enable the starting circuit and then returned to its primary position to enable the ignition circuit;
   a second multi-position code input switch interposed in the ignition circuit and connected to be closed in only one position thereof;
   first impedance means interposed between the gate and the relay; and
   means connecting the primary output contact of the first input code switch with the relay, said means including a second impedance therein, said impedances being selected to require the additive effect of current flowing therefrom to the relay to initiate actuation of the relay.

2. An anti-theft device as defined in claim 1 further comprising:
   a third multi-position code input switch interposed in the ignition circuit, all but one of the output terminals of said third switch being shorted together to ground thereby to short out the ignition except when said third switch is in a predetermined position.

3. A vehicle anti-theft device for enabling and disabling the starting and ignition systems associated with a vehicle engine comprising:
   a relay-operated switch interposed in the starting circuit;
   a multi-position code input switch having an indicia display for each position of the switch, said switch having an input terminal connected to the battery and a plurality of output terminals;
   a primary of the output terminals being connected to the ignition circuit;
   said relay being connected to the battery through a self-locking gate constructed and arranged to be switched to a conductive configuration and to remain in said conductive configuration as long as current flows therethrough;
   said gate having an actuating input terminal connected to a different, secondary of the output terminals of said code input switch thereby requiring the code input switch to first be set to its secondary position to enable the starting circuit and then returned to its primary position to enable the ignition circuit;
   a second multi-position code input switch interposed in the ignition circuit and connected to be closed in only one position thereof;
   a third multi-position code input switch interposed in the ignition circuit, all but one of the output terminals of said third switch being shorted together to ground thereby to short out the ignition except when said third switch is in a predetermined position; and
   a fourth multi-position code input switch interposed between the gate and the relay.

4. A vehicle anti-theft device for enabling and disabling the starting and ignition circuits associated with a vehicle engine comprising:
   a relay-operated switch interposed in the starting circuit;
   a multi-position code input switch having an indicia display for each position of the switch, said switch having an input terminal connected to the battery and a plurality of output terminals;
   a primary of the output terminals being connected to the ignition circuit;
   said relay being connected to the battery through a self-locking gate constructed and arranged to be switched to a conductive configuration and to remain in said conductive configuration as long as current flows therethrough;

said gate having an actuating input terminal connected to a different, secondary of the output terminals of said code input switch thereby requiring the code input switch to first be set to its secondary position to enable the starting circuit and then returned to its primary position to enable the ignition circuit;

a second multiposition code input switch interposed in the ignition circuit, all but one of the output terminals of said third switch being shorted to ground thereby to disable the ignition circuit except when said third switch is in a predetermined position;

first impedance means interposed between the gate and the relay; and means connecting the primary output contact including a second impedance therein, said impedances being selected to require the additive effect of current flowing therefrom to the relay to initiate actuation of the relay, thereby to require setting of the second code input switch to its predetermined position before operating said first code input switch.

* * * * *